United States Patent [19]

Frank et al.

[11] 4,019,095
[45] Apr. 19, 1977

[54] CAPACITOR EQUIPMENT
[75] Inventors: Harry Frank; Kjell Rehnman, both of Vasteras, Sweden
[73] Assignee: ASEA Aktiebolag, Vasteras, Sweden
[22] Filed: June 5, 1975
[21] Appl. No.: 584,003
[30] Foreign Application Priority Data
June 25, 1974 Sweden .................. 74083114
[52] U.S. Cl. .................. 361/79; 361/113; 361/52
[51] Int. Cl.² .................. H02H 7/20
[58] Field of Search .......... 317/9 PE, 33 SC, 12 B, 317/12 R, 20, 50, 53; 307/133
[56] References Cited
UNITED STATES PATENTS

| | | | |
|---|---|---|---|
| 2,099,568 | 11/1937 | Metzger | 317/9 PF X |
| 3,548,289 | 12/1970 | Liska et al. | 317/33 SC X |
| 3,611,043 | 10/1971 | Steen | 317/33 SC |
| 3,646,398 | 2/1972 | Kotos | 317/33 SC |
| 3,916,287 | 10/1975 | Brenneisen et al. | 317/33 SC X |

*Primary Examiner*—J D Miller
*Assistant Examiner*—Patrick R. Salce

[57] ABSTRACT

In capacitor equipment which includes a series-connection, connected to an alternating voltage network, of two anti-parallel connected thyristors, one capacitor and one reactor, a control device is connected to the control electrode of the thyristors and arranged to ignite the thyristors alternately at times in the vicinity of the peak value of the alternating voltage. A sensing member is provided for sensing an operating magnitude in the series connection and a level-sensing member is connected to the sensing member and to the control device. The level-sensing member influences the control device to produce ignition of both thyristors of the instantaneous value of the operating magnitude falls outside a pre-determined interval.

6 Claims, 5 Drawing Figures

CAPACITOR EQUIPMENT

BACKGROUND OF THE INVENTION

1. Field of the Invention

The present invention relates to capacitor equipment which comprises a series-connection, connected to an alternating voltage network, of
   a. two anti-parallel-connected thyristors,
   b. one capacitor
   c. one reactor, a control device being connected to the control electrodes of the thyristors and arranged to ignite the thristors alternately at times in the vicinity of the peak value of the alternating voltage.

2. The Prior Art

Capacitor equipment of this kind is known and it is used, for example, for power-factor correcting purposes, that is, for compensation of a varying reactive current which is consumed by a load object. Usually a plurality of series-connections are then connected in parallel with each other to the network, and the number of capacitors which are connected at each moment is determined by the need for compensation at the time in question. Suitably a reactive power-sensing member can be arranged to sense the reactive power consumed by the load object and, in dependence thereon, to control the connection and disconnection of the capacitors.

Connection of a capacitor is performed by igniting the thyristors connected in series with the capacitor, and suitably at such a time that the voltage to which the capacitor is charged is as great as the instantaneous value of the alternating voltage.

Disconnection of a capacitor is achieved by removing the ignition signal to the thyristors, so that the thyristor which is conducting at the time is extinguished at the next zero passage of the capacitor current.

Each capacitor may, of course, consist of a battery of series and/or parallel-connected capacitors, which is most common in practice.

The whole capacitor equipment may be connected to the network by way of a transformer in order to obtain a suitable level of the current and the voltage for the components included in the equipment. Suitably a circuit breaker is arranged between the equipment and the network to disconnect the equipment in case of a fault.

The reactor mentioned in the introduction is usually arranged in series with each capacitor, among other things to limit the current derivative when connecting the capacitor, and thus to protect the thyristors.

In a three-phase network, capacitor equipment of the type described may be constructed with three phases, in which case capacitors are connected between each pair of conductors. It will thus also be possible to compensate for an unsymmetrical reactive power consumption.

In thyristor equipment of this kind, it is inevitable that a so-called misfiring will occur at some times, which cannot be completely prevented. A misfiring occurs when a thryistor is ignited at a time when it should not be ignited. Misfirings may be caused by transient voltages and other disturbances, or by malfunctioning of the control devices of the thyristor.

In capacitor equipment of the type described, a misfiring may have serious consequences. As will be described below, it gives rise to overcurrents and overvoltages, which may be of such a magnitude that even amply dimensioned components are destroyed. This applies primarily to the thyristors included in the equipment.

SUMMARY OF THE INVENTION

The invention relates to equipment in which the overvoltages and overcurrents occurring as a result of a misfiring are eliminated in a simple manner or reduced so far that components which are dimensioned in a normal manner are fully protected.

According to the invention, capacitor equipment of the type described above is provided with a sensing member which senses an operating magnitude in the series connection and a level-sensing member connected to the sensing member and to the control device which includes means to influence the control device to produce ignition of both thyristors in response to an instantaneous value of the operating magnitude outside a pre-determined interval. The ignition producing means includes means to supply an ignition pulse to the thyristors which has a duration which is greater than one-half cycle but less than a whole cycle of the oscilating circuit formed of the capacitor and the reactor. The series connection is connected to the alternating voltage network through a circuit breaker, and the level-sensing member is connected to the breaker and includes means to supply a signal to release the breaker when the operating magnitude falls outside a predetermined interval.

BRIEF DESCRIPTION OF THE DRAWINGS

The invention will be described in the following with reference to the accompanying FIGS. 1 and 2.

DESCRIPTION OF THE PREFERRED EMBODIMENTS

Figure 1:
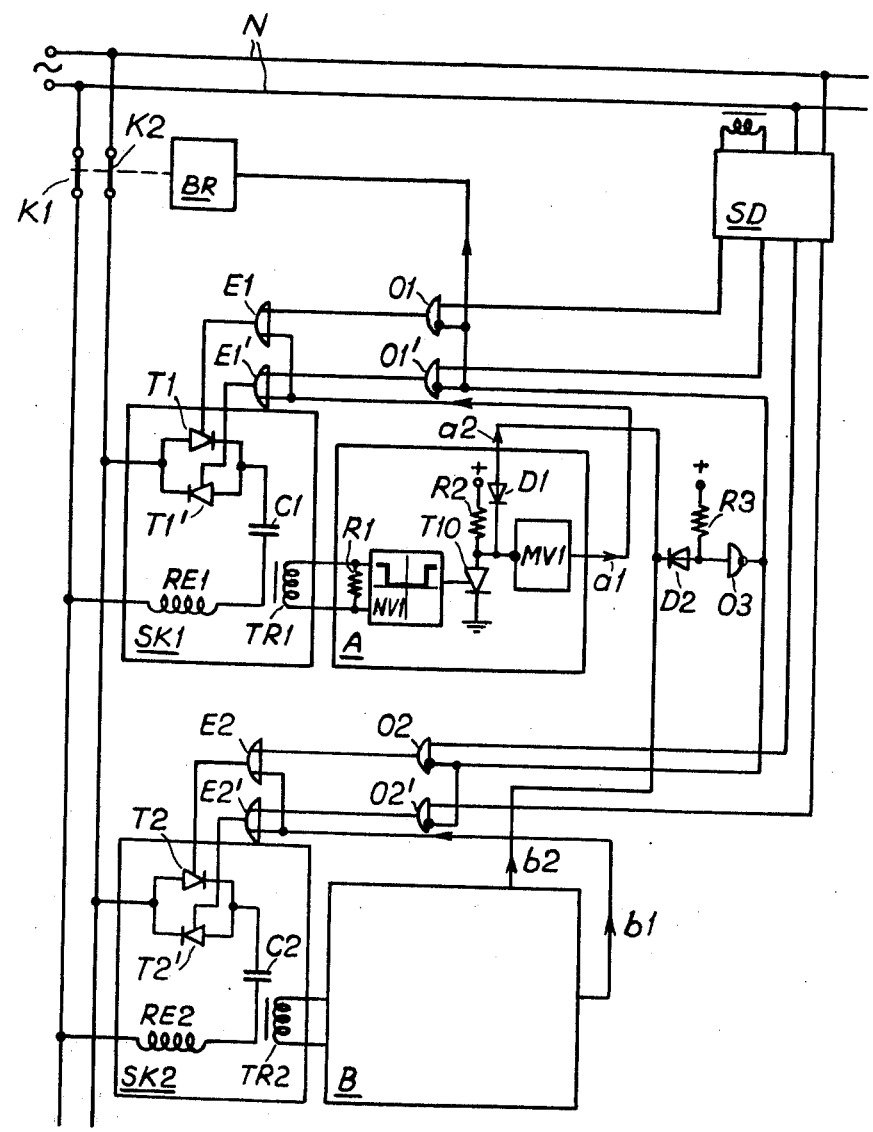
FIG. 1 shows a circuit diagram for equipment according to the invention.

FIG. 1 shows a single phase alternating voltage network N. Capacitor equipment is connected to the network by a breaker with the operating mechanism BR and the contacts K1 and K2. The equipment comprises two capacitor units SK1 and SK2. Each of these comprises a capacitor bank (C1 and C2, respectively), a set of anti-parallel-connected thyristors (T1, T1' and T2, T2', respectively) and a reactor (RE1 and RE2, respectively). A control device SD, known per se, is arranged to sense the reactive current or power of the network and to control the thyristors in dependence thereon.

During undisturbed operation, the output signals a1 and b1 from the units A and B in the Figure are "zero" and the output signals a2 and b2 "one", and the control signals from the control device SD are therefore forwarded through the AND circuits 01, 01' and the OR circuits E1, E1' to the control connections of the thyristors T1 and T1'. Correspondingly, the control signals are forwarded to the thyristors T2 and T2' through the AND circuits 02, 02' and the OR circuits E2, E2'.

Each capacitor unit is provided with a protection unit (A and B, respectively) which becomes active in case of misfiring. A current transformer TR1 delivers a voltage by way of resistor R1, which voltage is proportional to the current through the capacitor C1. This voltage is supplied to a level-sensing circuit NV. If the absolute value of the capacitor current exceeds a level determined by the circuit NV, which level is greater than the current occurring during undisturbed operation, the output signal from NV becomes one. In series with the resistor R2, the auxiliary thyristor T10 is connected to a positive voltage. The anode of the thyristor is connected to the input of a monostable multivibrator MV1 which, in case of a signal zero on the input, delivers a one pulse wth a suitable duration.

During undisturbed operation, the output signal from NV1 is zero, the thyristor T10 is non-conducting and the output signal from MV1 is zero. In case of misfiring of some of the thyristors T1 and T1', the current through C1 rapidly grows to a high value, the output signal from NV1 becomes one, the thyristor T10 is ignited, and the output signal from MV1 becomes one. This signal constitutes the output signal a1 from the unit A. It is supplied to the OR circuits E1 and E1' and an ignition signal is then delivered to both thyristors T1 and T1'.

The duration of the one pulse from MV1 is suitably greater than half a cycle but smaller than a whole cycle of the oscillating circuit which is formed of the capacitor C1 and the reactor RE1. The period of this oscillating circuit is also affected by the network reactance, which must be taken into consideration.

In a manner which will be described below, the oscillating circuit completes a whole oscillation, after which the thyristors T1 and T1' are extinguished.

At the same time that the signal a1 from unit A becomes one, the signal a2 also becomes zero. This signal remains in the position zero as long as voltage is supplied to the thyristor T10. The signal a2 is supplied to the AND circuit 03 through the diodes D1 and D2. To the input of the AND circuit a positive voltage is connected through the resistor R3. The output signal from 03 becomes one, the breaker thus being released and disconnecting the capacitor equipment from the network N. The output signal from 03 is also supplied to the AND circuits 01 and 01' and 02 and 02'. The control signals to the thyristors T1 and T1' and T2 and T2' are then broken, which thyristors are thus extinguished. In this way the current that the breaker has to break is reduced.

The capacitor unit SK2 is provided with a protection unit B, which is constructed in the same manner as the unit A. Upon a misfiring, it delivers a signal b1, which ignities both thyristors T2 and T2', and also a signal b2, which releases the breaker and disconnects the control signals to the thyristors in the unit SK1.

Figure 2A:
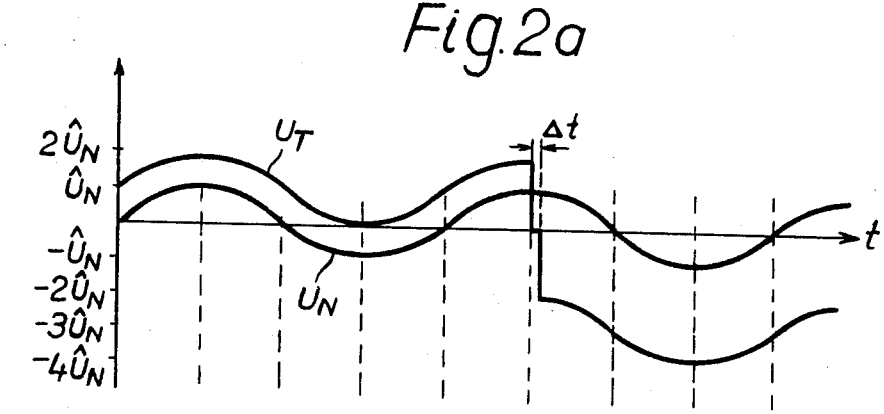
FIGS. 2b and d show the time progress of some of the electrical magnitudes occurring in the equipment upon a misfiring, and FIG. 2 a and c show the corresponding magnitudes in equipment of a previously known kind.

FIG. 2a shows the progress of the line voltage $U_N$ and the voltage $U_T$ across the thyristors in equipment which is not provided with a protection circuit according to the invention. The peak value of the line voltage is designated $\hat{U}_N$. The figure refers to the case when a misfiring occurs at the moment when the voltage across the thyristors has its maximum value ($2.\hat{U}_N$). The oscillating circuit, formed of the capacitor and the reactor connected in series therewith, completes half an oscillation during the time $\Delta t$, whereafter (if the reason for the misfiring has ceased) the conducting thyristor is extinguished. During this time the capacitor charge is reversed, a strong current pulse thus traversing the connection. When the oscillation is finished the voltage across the thyristors is $2.\hat{U}_N$ and after a half a cycle of the line voltage it is $4.\hat{U}_N$. The voltage load on the thyristors thus becomes twice as great as during undisturbed operation.

Figure 2B:
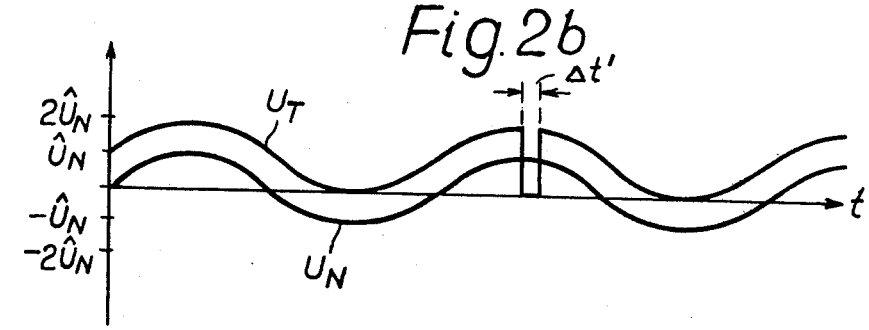
Figure 2C:
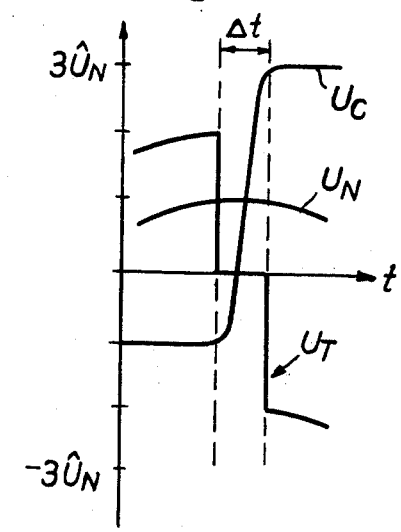

FIG. 2c shows in greater detail the progress during the interval $\Delta t$. During the interval the voltage $U_T$ is zero since one of the thyristors is conducting. The capacitor is recharged from the voltage $-\hat{U}_N$ to the voltage $+3.\hat{U}_N$.

Figure 2D:
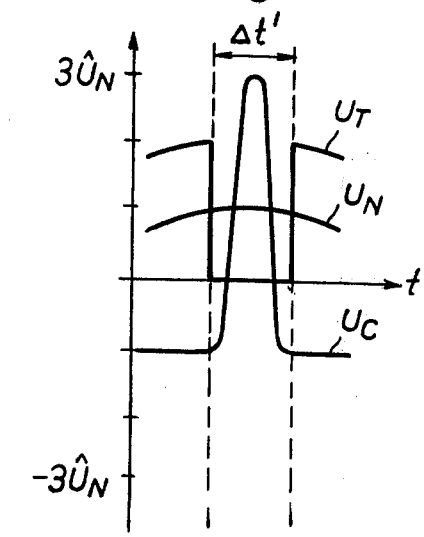

FIGS. 2b and 2d show the corresponding process in equipment according to the invention. The misfiring is assumed to take place at the same time as in FIG. 2a. After the time $\Delta t'$ the circuit has completed one whole oscillation. During the first half cycle of the oscillation the thyristor, whose misfiring started the process, is conducting and the capacitor voltage is changed from $-\hat{U}_N$ to $+3.\hat{U}_N$. During the latter half cycle the second thyristor is conducting, which has received an ignition signal with the help of the auxiliary circuit according to the invention, and the capacitor voltage oscillates back to a value which corresponds closely to the original value ($-\hat{U}_N$). As will be seen, the voltage across the thyristors never exceeds the voltage ($2.\hat{U}_N$) to which they are exposed during undisturbed operation.

The natural frequency of the oscillating circuit may, in a typical case, amount to about 225 Hz, corresponding to the period 4.4 ms. The length of the pulse delivered by the flip-flop MV1 in FIG. 1 is thus chosen to have a value between 2.2 and 4.4 ms, for example 2.5 ms.

According to an alternative embodiment of the invention, the flip-flop MV1 is omitted and the signal a1 (as well as a2) is taken from the anode of the auxiliary thyristor T10. In this case the oscillation will continue until it is damped out or the breaker is released. This embodiment is advantageous if there is a risk that the disturbance which causes the misfiring will last longer than the time $\Delta t'$ in FIG. 2b. However it results in a greater current load on the thyristors that the embodiment described previously.

In the above-mentioned example, the sensed operating magnitude which indicates the misfiring consists of the capacitor current, which provides a quick indication in case of misfiring. Alternatively other operating magnitudes may be used to indicate a misfiring, for example the voltage across the capacitor or the reactor. It is also possible to use the voltage across the thyristors. In that case a misfiring is indicated by the fact that the voltage across the thyristors decreases to zero at moment when it should be different from zero in undisturbed operation.

In the circuit described above, single-phase equipment has been shown, but the equipment according to the invention may jut as well be three-phase equipment. Similarly, only two capacitor units (SK1 and SK2) are shown in FIG. 1. However, the equipment according to the invention may comprise any desired number of units per phase.

We claim:

1. Shunt capacitor equipment which comprises a series-connection, connected to an alternating voltage network, of
   a. two antiparallel-connected thyristors,
   b. one capacitor,
   c. one reactor,
in which a control device is connected to the control electrodes of the thyristors and arranged alternately to ignite the thyristors at times in the vicinity of th peak value of the alternating voltage, the improvement which comprises a sensing member for sensing an operating magnitude in said series-connection and a level-sensing member connected to the sensing member and to the control device including means to influence the control device to produce ignition of both thyristors in response to one instantaneous value of the operating magnitude outside a predetermined interval.

2. Shunt capacitor equipment according to claim 1, in which said operating magnitude consists of the current through the capacitor.

3. Shunt capacitor equipment according to claim 1, in which said operating magnitude is the voltage across the capacitor.

4. Shunt capacitor equipment according to claim 1, in which the means to produce ignition of both thyristors comprises members arranged to emit an ignition pulse to the thyristors in response to a value of the operating magnitude outside the predetermined interval said ignition pulse having a duration which is greater than half a cycle but less than a whole cycle of the oscillating circuit formed of the capacitor and the reactor.

5. Shunt capacitor equipment according to claim 1, in which the series-connection is connected to the alternatng voltage network by way of a circuit breaker, and the level-sensing member is connected to the breaker and includes means to deliver a signal to release the breaker when the operating magnitude falls outside the predetermined interval.

6. Shunt capacitor equipment according to claim 1, in which at least one further series-connection is connected to the alternating voltage network, and the level-sensing member is connected to said additional series-connection and includes means to block the ignition of its thyristors when the operating magnitude falls outside the predetermined interval.

* * * * *